United States Patent

Smith et al.

[11] Patent Number: 4,554,864
[45] Date of Patent: Nov. 26, 1985

[54] FOOD COOKER

[75] Inventors: Terry W. Smith, N. Miami Beach, Fla.; Timothy R. Fallon, Spartanburg, S.C.

[73] Assignee: Draft Systems, Inc., Spartanburg, S.C.

[21] Appl. No.: 618,888

[22] Filed: Jun. 8, 1984

[51] Int. Cl.⁴ .............................................. A47J 37/04
[52] U.S. Cl. ...................................... 99/340; 99/343; 99/352; 99/417; 99/448; 99/482; 126/9 R; 126/25 R
[58] Field of Search .................. 99/340, 343, 352, 417, 99/448, 449, 467, 482; 126/9 R, 25 R, 273 R, 275 R; 426/523

[56] References Cited

U.S. PATENT DOCUMENTS

| | | | |
|---|---|---|---|
| 2,626,559 | 1/1953 | Rau | 99/352 |
| 2,789,877 | 4/1957 | Pfundt | 99/482 X |
| 3,299,800 | 1/1967 | Angelo | 99/417 |
| 3,333,526 | 8/1967 | Kirkpatrick | 99/352 X |
| 3,776,127 | 12/1973 | Muse | 99/352 X |
| 4,020,322 | 4/1977 | Muse | 99/482 X |
| 4,094,295 | 6/1978 | Boswell | 126/25 R |
| 4,300,444 | 11/1981 | Muse | 99/448 |
| 4,495,860 | 1/1985 | Hitch | 99/340 |

Primary Examiner—Billy J. Wilhite
Attorney, Agent, or Firm—Luke J. Wilburn, Jr.

[57] ABSTRACT

A portable food cooker for water smoker or direct heat cooking of food products comprising a support pedestal mounted on wheels and containing a heating unit, an open-ended wall section removably supported with a lower open end on the pedestal in communication with the heating unit and extending upwardly therefrom, a removable cover for closing the upper end of the wall section and defining with the pedestal and wall section a confined cooking compartment, one or more food support grills mounted at selected elevations in the compartment, and a pan located in the compartment below the grills and above the heating unit to contain water for water smoker cooking or, alternatively, fuel for direct heat cooking. The pan catches and contains material falling from food on the grill during the cooking operation, and an annular reservoir in the bottom of the wall section collects materials falling into the lower portion of the cooking compartment. The pedestal, wall section, and cover are readily separable to permit cleaning of the cooker.

9 Claims, 7 Drawing Figures

4,554,864

FOOD COOKER

This invention relates to a portable food cooker and, more particularly, to an improved food cooker of the water smoker and barbecue type employed in patio and outdoor food preparation areas.

BACKGROUND OF THE INVENTION

Barbecue grill and water smoker food cookers are widely employed in patio and outdoor areas to prepare various foods and meats for human consumption. Of recent popularity is the combination barbecue grill and water smoker cooker. One such cooker has a generally vertical tubular cooking compartment with an open bottom for air entry and top area opening closed by a removable cover. Horizontally mounted in the cooking compartment over a heat source are one or more vertically spaced food support grills. For water smoker cooking, a water pan is located below the grills and just above a lower heat source, such as a charcoal briquette pan with wood chips supported adjacent the bottom of the compartment. Heat from the charcoal produces a heated, moist atmosphere in the cooking compartment for slow, indirect smoke cooking of the food on the grills.

When the cooker is used for direct charcoal grill cooking, the water pan is removed from the cooking compartment and the charcoal pan raised to a location in the upper portion of the cooking compartment, just below the upper grill position, whereby direct heating of food on the grill can take place.

In certain other water smoker cooker constructions, permanent heating means, such as an electric or gas heating unit, are located in the lower portion of the cooking compartment to serve as the heat source for the water smoker cooker.

Because smoke, cooking residue, and greases normally build up in the cooking compartment of barbecue and water smoker cookers, it is desirable to routinely clean the interior of the cooker. Due to the size and outdoor location of such food cookers, cleaning often is a problem, particularly if the cooker has a permanent heating unit, such as an electric or gas burner, located in the bottom of the cooker, precluding use of a direct water or detergent wash of the cooking compartment.

In cookers with permanent heating units, it is also desirable to protect the heating units as much as possible from contamination by cooking greases and residue to maintain the efficiency and prolong the life of the same.

BRIEF OBJECTS OF THE INVENTION

It is an object of the present invention to provide an improved portable food cooker of the water smoker and barbecue grill type.

It is another object to provide an improved food cooker of the water smoker/barbecue grill type having a permanent heating unit as a heat source for the cooker.

It is another object to provide a portable food cooker which may be employed as a water smoker with permanent heating unit, or alternatively as a charcoal grill cooker for direct heat cooking of food.

It is a further object to provide a food cooker construction which may be easily removed from the heat source for cleaning of the cooking compartment of the same.

It is still another object to provide an improved portable food cooker of the water smoker/charcoal grill type having means protecting the permanent heating unit of the cooker from contamination from by-products of the cooking operation, and providing collection means for containing greases and liquids accumulating during the cooking operation.

SUMMARY OF THE INVENTION

The invention comprises an improved portable food cooker having a permanent heating unit and which may be employed for both water smoker cooking and direct charcoal grill cooking of foods therein. The cooker includes a pedestal, or base, containing a heating unit. Removably mounted on the pedestal is an open-ended, generally vertical wall section closed at its upper end by a removable cover. The pedestal, wall section, and cover cooperate to define a cooking compartment containing one or more food supporting grills selectively supported at different elevations therein. For water smoker cooking, a water pan is supported below the grills and above the heating unit and protects the heating unit from contamination by liquid and solid by-products of the cooking operation. The lower portion of the cooking compartment wall section has a peripheral reservoir or trap for collection of liquid or solid by-products of the cooking operation which are not caught in the water pan. The vertical wall section of the cooking compartment is readily removed from the pedestal to facilitate cleaning of the interior of the cooker. The cooker is converted to direct heat grill cooking by raising the water pan to an upper level in the cooking compartment and using it to contain charcoal directly beneath a food support grill.

BRIEF DESCRIPTION OF THE DRAWINGS

The above as well as other objects of the invention will become more apparent, and the invention will be better understood from the following detailed description of a preferred embodiment thereof, when taken together with the accompanying drawings, in which.

DETAILED DESCRIPTION OF PREFERRED EMBODIMENT

Figure 1:
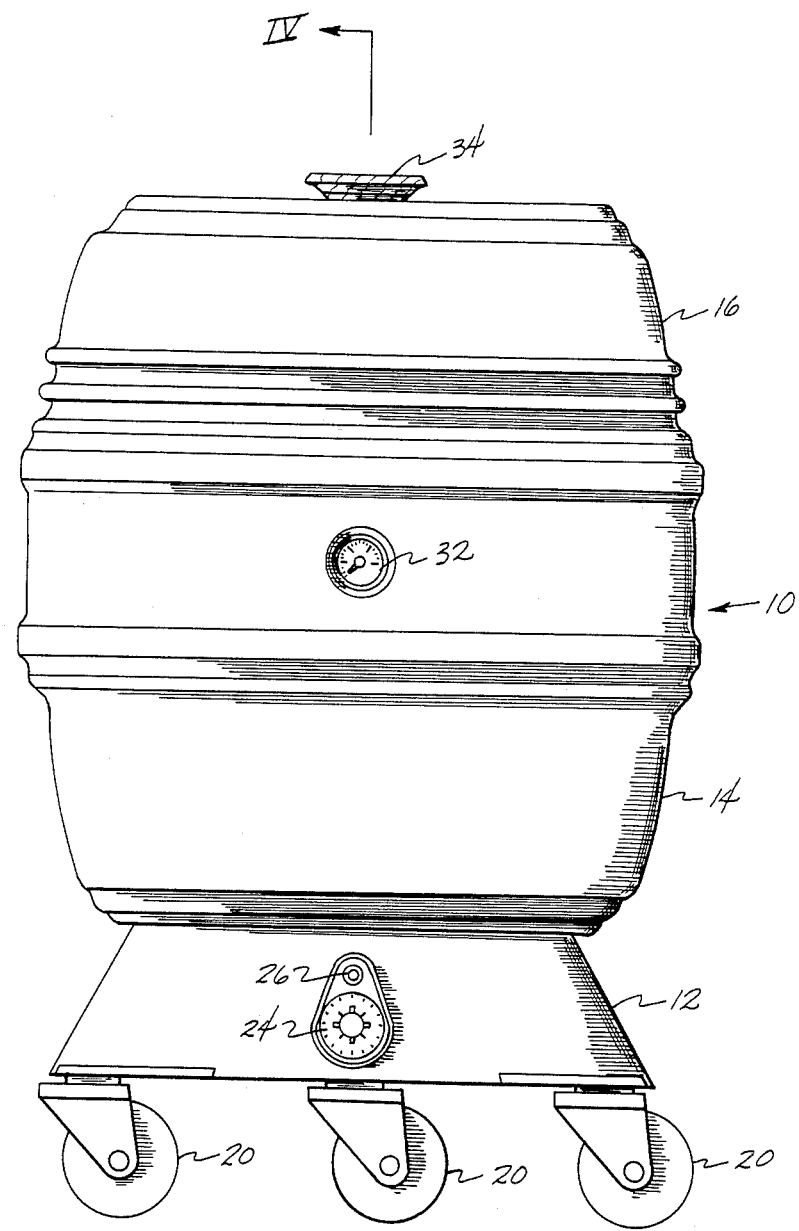
FIG. 1 is a front elevation of the food cooker of the present invention.
Figure 2:
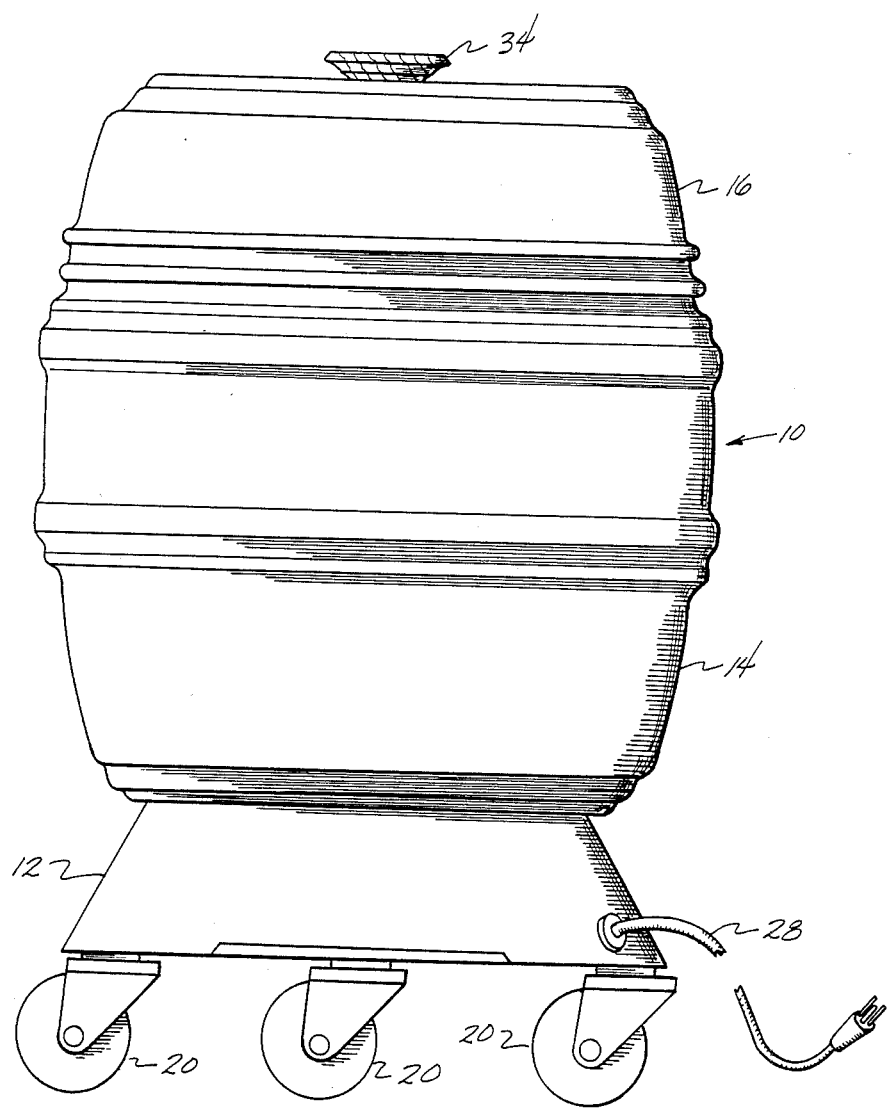
FIG. 2 is a rear elevation view of the cooker as seen in FIG. 1.
Figure 3:
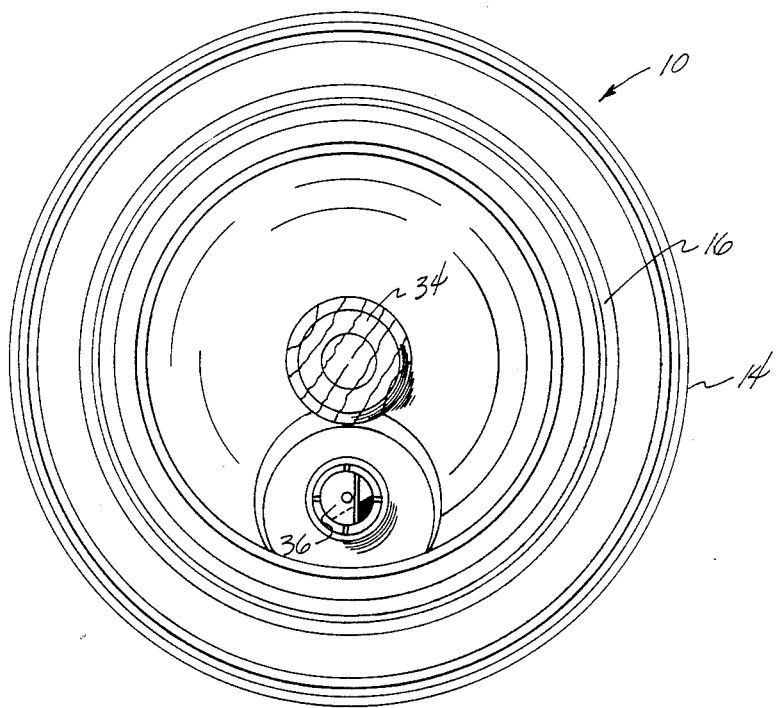
FIG. 3 is a top plan view of the cooker of FIG. 1.
Figure 4:
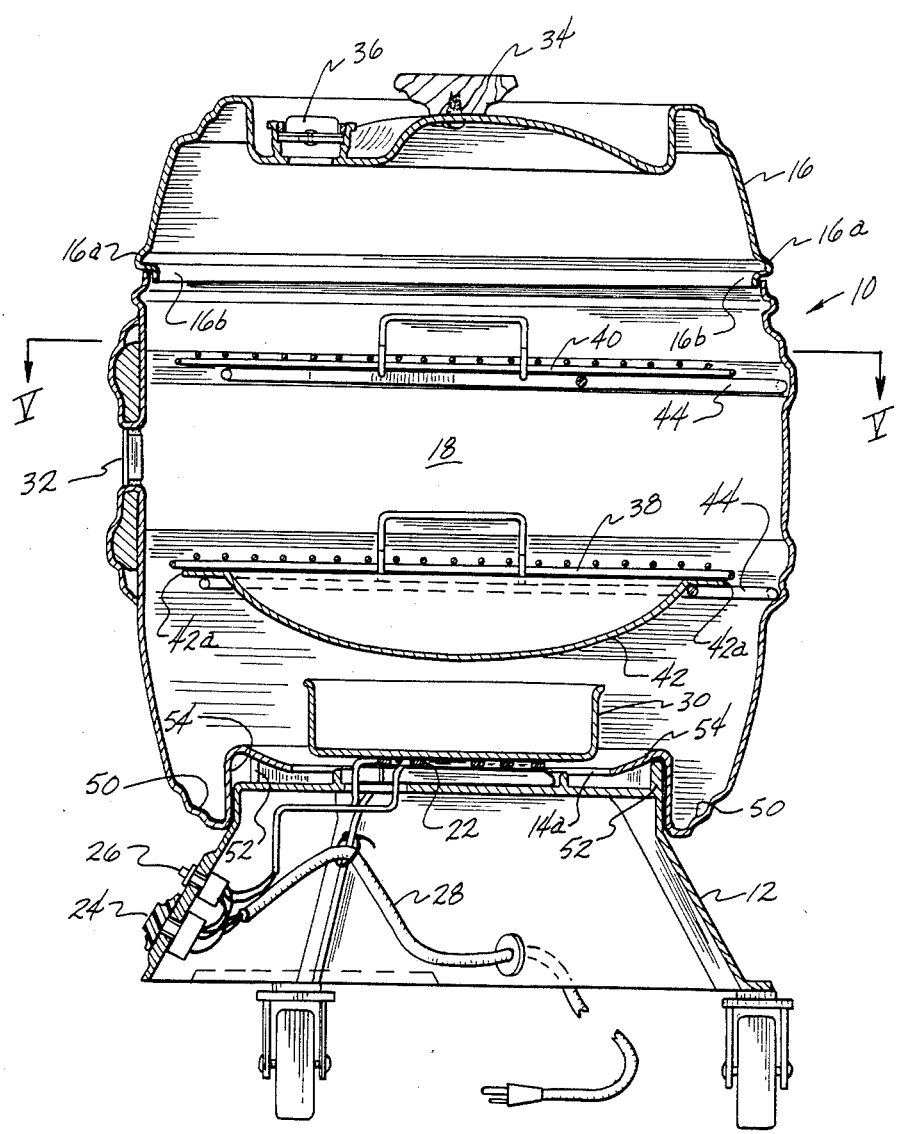
FIG. 4 is a vertical section view of the cooker taken along line IV—IV of FIG. 1, and looking in the direction of the arrows.
Figure 5:
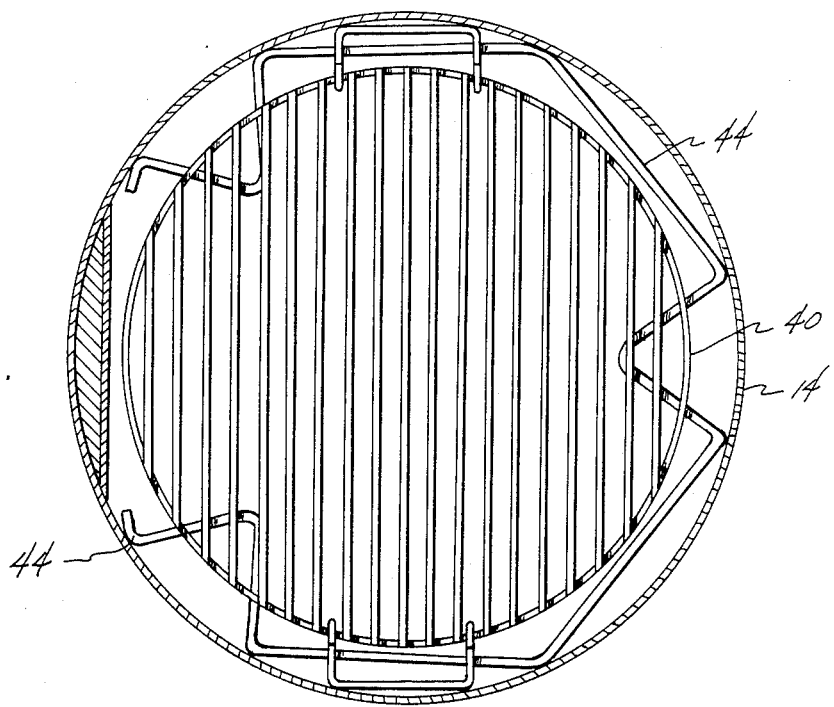
FIG. 5 is a horizontal section view taken along line V—V of FIG. 4, and looking in the direction of the arrows.

As seen in the drawings, the food cooker 10 of the present invention includes a pedestal 12, an open-ended upstanding, generally cylindrical wall section 14, and a cover 16 which cooperate to define a closed cooking compartment 18 (FIG. 4). As seen, the body of the food cooker above the pedestal 12 has a basic shape and appearance of a beer keg/barrel, and the ornamental exterior design of the cooker with pedestal and cover forms the subject matter of a co-pending commonly assigned U.S. Design patent application Ser. No. 618,889 filed June 8, 1984.

As seen in the Figures, pedestal 12 of the food cooker is generally of frusto-conical shape and has three spaced wheels 20 pivotable about vertical axes to provide for rolling mobility of the cooker. Mounted on the upper surface of pedestal 12 is an electric calrod heating unit 22 (FIGS. 4 and 7) which is connected through a temperature control switch 24, power indicator light 26, and electrical cord 28 for connection to an electrical power source. Supported on the calrod unit 22 is a heavy metal pan 30 (FIG. 4) made of heat retentive material, such as cast iron, which serves as a heat sink and also to contain wood chips used to provide the smoke flavor to the food being cooked. Typically, the wood chips are soaked in water for a period prior to use to prolong the smoke effect during the cooking operation.

Located in the upstanding wall section 14 of the cooking compartment is a temperature indicator 32, which may be of the bimetallic sensor type, to indicate the interior temperature of the cooking compartment 18. The cover 16 for the upper access opening to the cooking compartment has a central lifting knob 34, and an adjustable air vent 36 to control release of heated gas and smoke from the cooking compartment during the cooking operation.

The rim of cover 16 of the cooking compartment has an annular bead 16a with a depending circular skirt portion 16b which fits downwardly inside the upper opening of wall section 14 of the cooking compartment, thus sealing the upper opening of the wall section and directing any liquid materials which collect on the inside of the cover during the cooking operation downwardly down into the cooking compartment.

As seen in FIG. 4, adjustably mounted in the cooking compartment 18 are two horizontal food support grills 38, 40 which are located at vertically spaced elevations. A metal water pan 42 is located below the grills and above the calrod heating unit 22 of the cooker. Each grill and the water pan is supported from the inside wall of the cooking compartment by resilient metal wire springs 44 which are biased outwardly to frictionally engage circular peripheral grooves in the wall section 14 of cooking compartment. The springs 44 have inwardly protruding portions upon which the peripheral edges of the grills and the water pan rest.

When the food cooker 10 is to be used as a water smoker, metal pan 30 is filled with water-soaked wood chips. Pan 42 is filled with a suitable liquid, such as water containing various herbs or spices, and the pan 42 is positioned immediately above the heating unit and the pan 30, as seen in FIG. 4. One or both food supporting grills 38, 40 may be used and positioned immediately above the water pan or at a higher elevation in the cooking compartment, as shown in FIG. 4, and they support food during the cooking operation. The temperature control switch 24 is adjusted to provide a desired temperature for smoke cooking of the food in the cooking compartment. From time to time, additional water and wood chips may be added to the cooking compartment.

Figure 6:
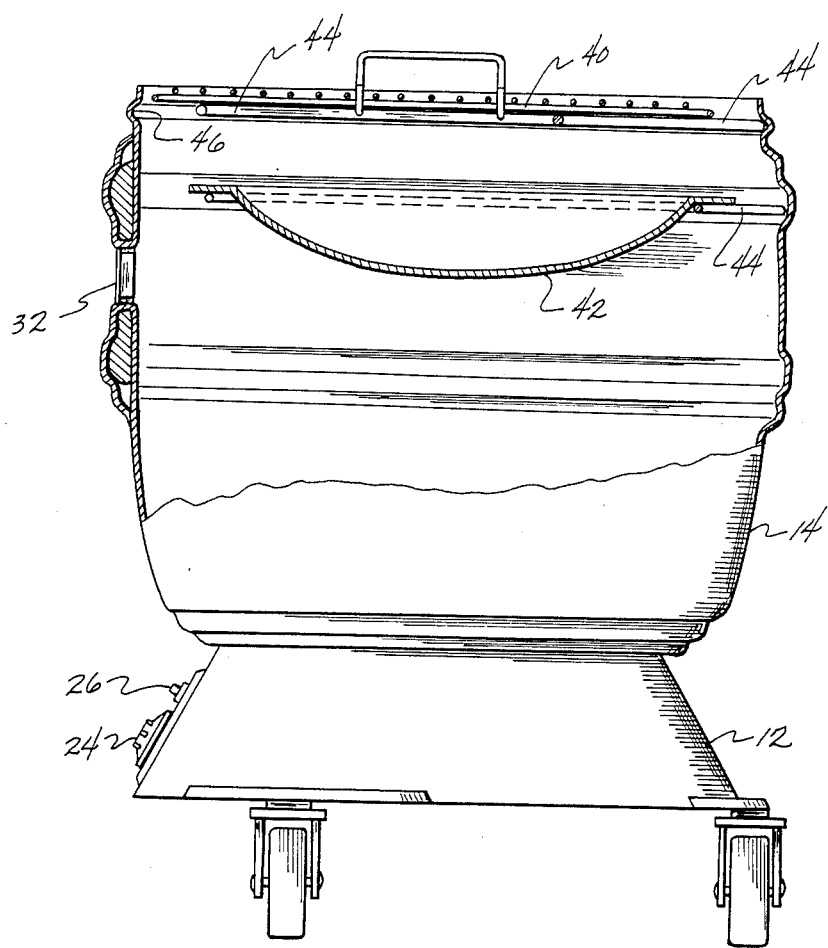
FIG. 6 is a right side elevation view of the cooker of FIG. 1, with cover removed and with portions broken away and in vertical section to show a manner of positioning the water pan and grill of the cooker for use in direct charcoal cooking of food.

When the food cooker is to be used as a charcoal grill for direct heat cooking of food, the water pan 42 is moved to an upper position in the cooking compartment and supported by wire spring 44, as shown in FIG. 6. A single food supporting grill 40 is mounted in an upper groove 46 of wall section 14 of the cooker by another wire spring 44, and the empty water pan filled with charcoal to serve as a heat source for the cooking operation.

As best seen in FIG. 4, the lower end portion 50 of wall section 14 of the cooker forms an annular reservoir or trap which surrounds the outer periphery of the pedestal 12 and serves to collect and retain liquid and other residue of the cooking operation which may accumulate and not be caught in the water or charcoal pan 42. The peripheral edge 42a of water pan 42 extends outwardly toward the side walls of the cooking compartment a sufficient distance to overlie the reservoir or trap portion 50 and protects heating unit 22 and the upper surface of pedestal 12 from direct contact and contamination by the cooking by-products.

Figure 7:
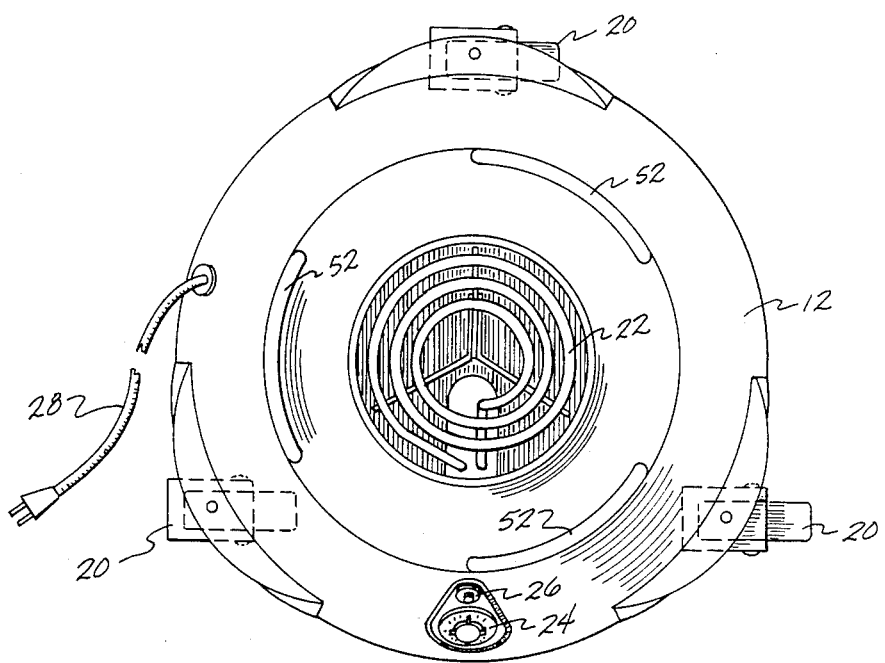
FIG. 7 is a plan view of the pedestal of the cooker shown in FIG. 1, with the upstanding wall section and cover of the cooker removed.

As also seen in FIG. 4, wall section 14 of the cooker has an opening 14a in its lower end so that calrod unit 22 directly communicates with the cooking compartment 18. Wall section 14 may be easily lifted and removed from the pedestal 12 and heating unit to facilitate cleaning of the cooker. As seen in FIGS. 4 and 7, wall section 14 is supported in alignment on pedestal 12 by three upstanding spaced arcuate guide ribs 52 on the upper surface of pedestal 12 which surround heating unit 22 and are received in a circular recessed portion 54 of wall section 14.

From the foregoing description of a preferred embodiment of the invention, it can be seen that the pedestal 12, wall section 14, and cover 16 of the food cooker may be readily and easily separated by permit direct wash water cleaning of the cover 16 and cylindrical wall section 14 separate from pedestal 12, and to permit ease in cleaning of the upper surface of pedestal 12.

The cooker 10 is constructed of high strength, heat resistant metal, such as stainless steel, cast aluminum, or the like.

Having described the present invention in detail, it is obvious that one skilled in the art will be able to make variations and modifications thereto without departing from the scope of the invention. Accordingly, the scope of the present invention should be determined only by the claims appended hereto.

That which is claimed is:

1. A food cooker comprising a support pedestal having an upper surface portion with periphery, a heating unit centrally mounted on the upper surface portion of the pedestal, an open-ended wall section removably supported with one open end on said pedestal and extending upwardly therefrom, a removable cover for closing the upper open end of the wall section and defining with the pedestal and wall section a cooking compartment, at least one food support grill located at an elevation within the cooking compartment, a pan having a periphery and located in the compartment below the grill and above the heating unit to catch and contain material falling from food on the grill during cooking, said wall section including a lower portion surrounding the periphery of the upper surface of the pedestal and defining a reservoir for collection of material falling into the lower portion of the cooking compartment, and said wall section and cover being separately removable from the pedestal to facilitate cleaning of the interior of the cooker.

2. A food cooker as defined in claim 1 wherein said lower portion of the wall section includes an upwardly recessed portion for receiving the upper surface portion of the pedestal therein, the lower opening in the wall section surrounds the pedestal heating unit with the reservoir spaced radially from and below said lower opening, and rib means on the upper surface portion of said pedestal for alignng the wall section for support on the pedestal.

3. A food cooker as defined in claim 1 wherein the outer periphery of the pan in the cooking compartment is spaced from the upwardly extending wall section to provide a peripheral passageway for upward movement of heat into the cooking compartment, a peripheral edge portion of the pan extending horizontally to overlie a portion of the reservoir in the lower portion of the cooking compartment.

4. A food cooker as defined in claim 1 including heat sink means positionable on said heating unit to receive heat therefrom.

5. A food cooker as defined in claim 4 wherein said heat sink means comprises a metal pan residing on the heating unit to contain wood chips.

6. A food cooker as defined in claim 11 including means for mounting said pan at a lower elevation in the cooking compartment above the heating unit for water smoker cooking, and means for mounting the pan at an upper elevation in the cooking compartment for use to contain charcoal for direct heat cooking of food.

7. A food cooker as defined in claim 6 including means for mounting multiple grills in the cooking compartment at selected elevations above the heating unit in the compartment.

8. A food cooker as defined in claim 1 wherein the pedestal has wheel means to provide for rolling portability of the cooker.

9. A food cooker comprising a support pedestal having an upper surface portion and a periphery, a heating unit centrally mounted on the upper surface portion of the pedestal, an open-ended wall section removably supported with one open end on the pedestal and extending upwardly therefrom, a removable cover for closing the upper open end of the wall section and defining with the pedestal and wall section a cooking compartment, at least one food support grill located at an elevation in the cooking compartment, a pan located in the compartment below the grill and above the heating unit to catch and contain material falling from food on the grill during cooking, said wall section being of generally circular cross sectional configuration and having peripheral groove means extending horizontally around the section at spaced elevations in the cooking compartment, resilient wire spring support means positionable in said groove means and engageable with the pan and grill to support the same at selected elevations in the cooking compartment, and said wall section and cover being separately removable from the pedestal to facilitate cleaning of the interior of the cooker.

* * * * *